United States Patent
Ceruti et al.

[11] Patent Number: 5,896,527
[45] Date of Patent: Apr. 20, 1999

[54] ACCESSING DATA DURING THE TRANSITION BETWEEN PROGRAM RELEASES

[75] Inventors: Michael Jon Ceruti; Neng-Shin Chen, both of Naperville, Ill.

[73] Assignee: Lucent Technologies Inc., Murray Hill, N.J.

[21] Appl. No.: 08/962,181

[22] Filed: Oct. 31, 1997

[51] Int. Cl.$^6$ .................................................. G06F 17/30
[52] U.S. Cl. .................................................. 395/712; 707/203
[58] Field of Search .................................. 345/331, 971; 395/671, 676, 703, 712; 707/201, 203

[56] References Cited

U.S. PATENT DOCUMENTS

| | | |
|---|---|---|
| 4,425,618 | 1/1984 | Bishop et al. |
| 4,558,413 | 12/1985 | Schmidt et al. ......................... 707/203 |
| 4,809,170 | 2/1989 | Leblang et al. ......................... 395/703 |
| 5,155,847 | 10/1992 | Kirouac et al. ......................... 395/712 |
| 5,504,879 | 4/1996 | Eisenberg et al. ......................... 707/203 |
| 5,537,598 | 7/1996 | Kukula et al. ......................... 395/712 |
| 5,577,244 | 11/1996 | Killebrene et al. ......................... 707/203 |
| 5,659,735 | 8/1997 | Parrish et al. ......................... 395/703 |
| 5,706,510 | 1/1998 | Burgoon ......................... 395/712 |
| 5,797,015 | 8/1998 | Daniels, Jr. et al. ......................... 395/712 |

*Primary Examiner*—William M. Treat
*Attorney, Agent, or Firm*—Werner Ulrich

[57] ABSTRACT

A method and apparatus for efficiently accessing data in a system in which changes of program releases must be accommodated. Data is accessed via one of two indirect data accessing tables. When a new release is introduced into a system, and the new release is activated, a switch is made to an indirect data accessing table which points to the data to be used by the new release. The previously active data accessing table is maintained in case it is necessary to switch back to the old release. After the new release has been accepted, the contents of the second indirect data accessing table are copied into the first indirect data accessing table, and the first indirect data accessing table becomes active. Advantageously, only the data blocks which include changes need to be initialized, and the process of accessing data remains highly efficient.

6 Claims, 2 Drawing Sheets

ACCESSING DATA DURING THE TRANSITION BETWEEN PROGRAM RELEASES

TECHNICAL FIELD

This invention relates to a method and apparatus for efficiently accessing data for a process during the transition from one program release to another.

PROBLEM

Real time control systems such as the systems for controlling telecommunications switching systems are frequently operative under program control and are controlled by the programs (text) and data stored in the memory of the processors controlling these systems. As is well known, the programs are frequently updated to correct mistakes and/or to add features to the systems controlled by the programs.

T. P. Bishop and S. J. Picus: U.S. Pat. No. 4,425,618 describes one arrangement for handling the transition from one program release to the next. In any case where a segment of program text is changed from one release to the next, a test is performed to determine which release is currently being used and the appropriate segment of program text for that release is then selected. While this is a simple and efficient way of handling changes in program text, it is less efficient as a means for handling data changes in the data areas consulted by this program text.

A problem of the prior art, therefore, is that there is not an efficient arrangement for switching from data used by one release (the old program) to data used by a second release (the new program) especially when much of the data is unchanged.

SOLUTION

The above problem is solved and an advance is made over the prior art in accordance with applicants' invention wherein data is accessed via parallel sets of pointers, in a first and a second indirect data access table an old set of pointers for the old program, and a new set of pointers for the new program, and prior to accessing the data, a decision is made as to which access table should be used. In one preferred embodiment, the old and new sets of pointers are offset from each other by a constant offset, and the decision on which release is being used is used to initialize that offset. For cases where a block of data accessed via one of the pointers remains unchanged, the corresponding pointers in the old and new sets are the same; where the data is different, the corresponding pointers are different.

In accordance with one preferred embodiment, program text and the changed data for the new release are initialized in memory. For cases in which data is not changed, the pointers are initialized by copying the pointers from the old set into the corresponding positions of the new set of pointers. For cases in which the data is changed, the changes are implemented by properly initializing the pointers of the new set to point to the newly initialized blocks of data. A switch is then made to the new release, and the offset is initialized so that the new set of pointers is used.

If trouble is discovered during the soak period, the offset is changed back to zero and the old program and data are used. If no problems are encountered during the soak interval, then at the end of the soak interval, the contents of the new set of pointers (second table) are copied into the old set of pointers (first table), and the offset is changed back to zero. Thereafter, memory for the old program and data which is no longer needed can be reclaimed. Advantageously, this arrangement introduces minimum additional overhead for normally accessing data while providing facilities for using different data from one program release to the next.

DETAILED DESCRIPTION

Figure 1:
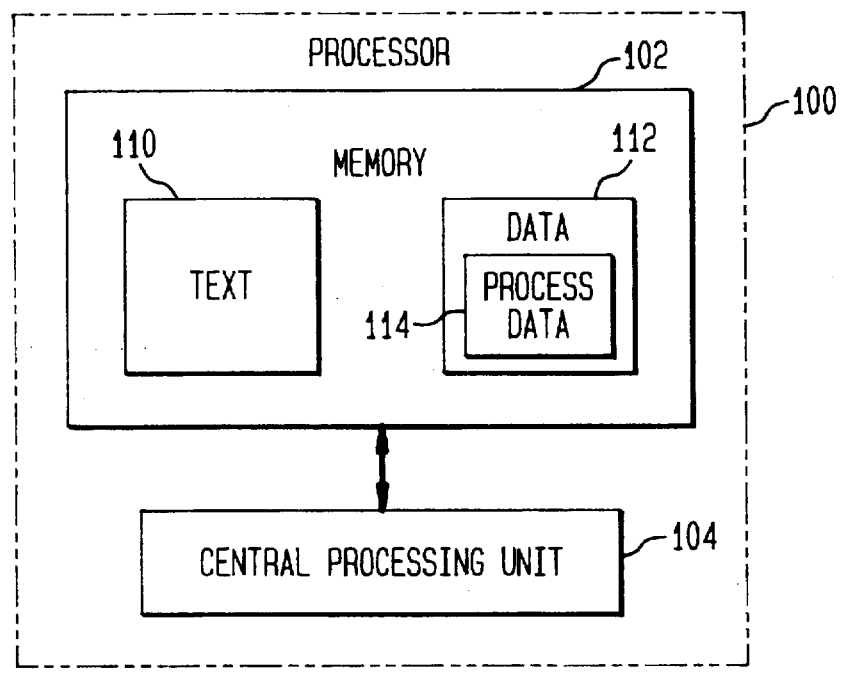
FIG. 1 is a block diagram of a processor used in accordance with this invention.

FIG. 1 is a block diagram of a processor for use in implementing applicant's invention. The processor comprises a central processing unit 104, and a memory 102. The CPU addresses the memory, writes into addressed memory, and reads from addressed memory. The memory includes Block 110, program text, and Block 112, data for use in conjunction with the program text for controlling a controlled system such as the switching network of a telecommunications switch. Block 114, within data Block 112, contains process data for use in conjunction with the program text for controlling a controlled process.

Figure 2:
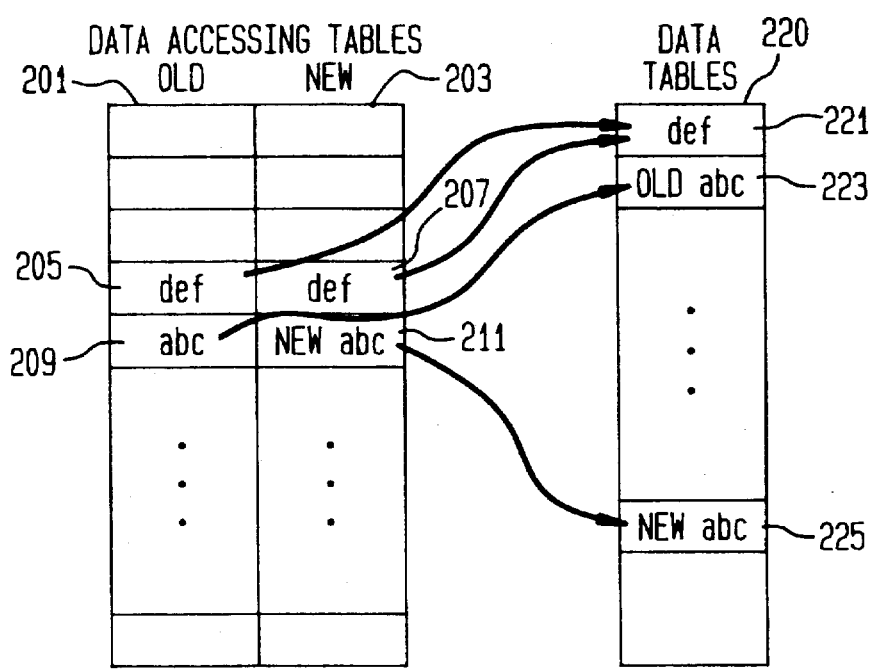
FIG. 2 is a memory layout diagram, illustrating applicant's invention.

FIG. 2 illustrates the layout of memory as used in accordance with the principles of applicants' invention. Indirect data access tables 201 and 203 are each a series of pointers to blocks of data. Table 201 (old pointer table), contains the pointers used in accessing data of the data areas 220 when operating under the old program. Table 203, (new pointer table), contains pointers used in accessing data of data areas 220 when the system is under the control of the new release. Typical pointer pairs are 205 and 209 (old pointers), and the corresponding entries, new pointers 207 and 211. Pointer 205 points to Block 221, labeled DEF; the corresponding pointer in the new table, pointer 207, points to the same Block; this is because the data stored in Block 221 has not been changed from the old release to the new release. In contrast, old pointer 209 points to Block 223 (old ABC) while the corresponding new pointer 211 points to Block 225 (new ABC); thus, when operating under the new release and using the new data accessing table 203, the new ABC data will be used.

Figure 3:
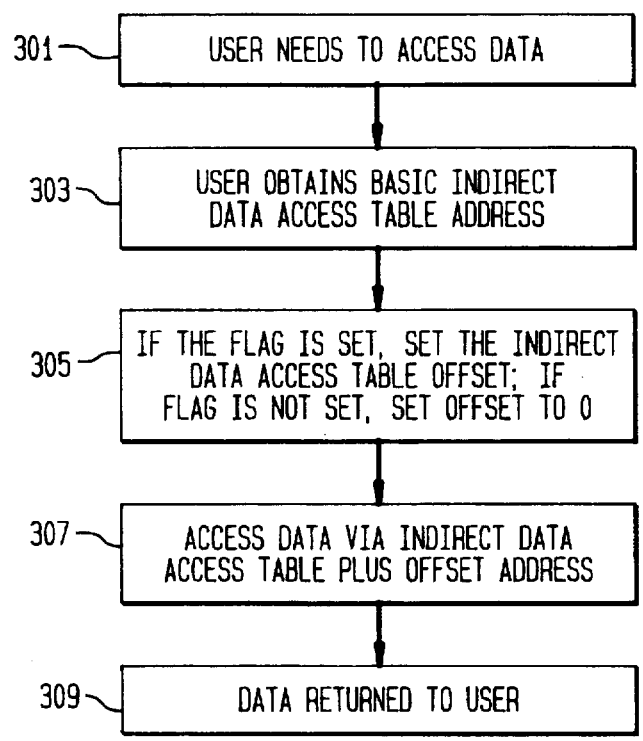
FIG. 3 and FIG. 4 are flow diagrams illustrating the method of applicant's invention.

FIG. 3 illustrates the process of accessing data in accordance with applicant's invention. A program ("user") needs to access data (Action block 301). The user obtains the basic indirect data access table address (i.e., the address of the initial entry in the old data accessing table). (Action block 303). If the flag indicating a transition to the new release is set, then the indirect data access table offset is set (Action Block 305). This indirect data access table offset represents the difference between the starting address of the old data accessing table 201, and the new data accessing table 203. If the relationship is as shown in FIG. 2, this offset is typically 4 bytes. The indirect access table is a two dimensional array, which yields better performance than two one dimensional arrays. The data is then accessed using the appropriate address of the indirect data access table plus offset to locate the pointer to the data to be accessed (Action Block 307). The accessed data is then returned to the user (Action Block 309).

Figure 4:
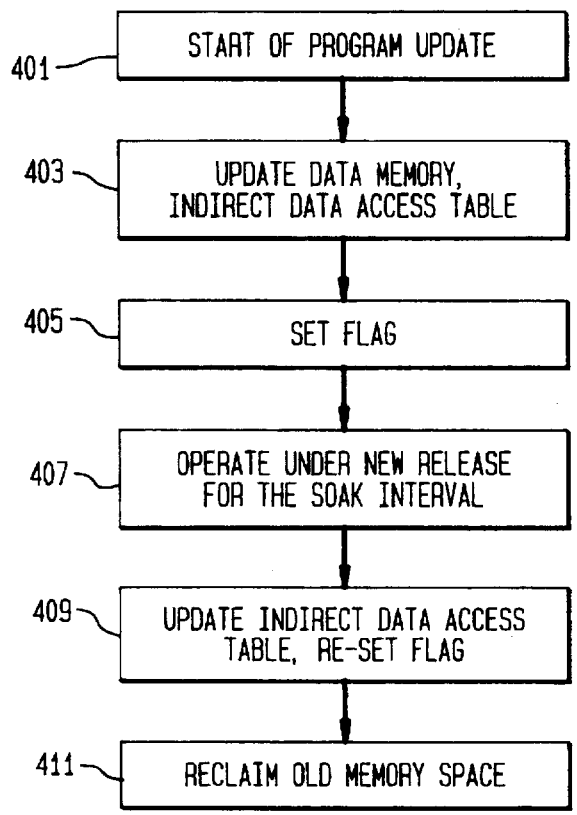

The process of introducing a new release as it pertains to the accessing of data is illustrated in FIG. 4. A program update is initiated (Action Block 401). The data memory, ie., data area 220), and the indirect data access table (new data accessing table 203) are updated (Action Block 403). At the point when a tentative transition is made to the new release (start of soak interval), the new release flag is set (Action block 405). This will lead to the use of the new indirect data access table in Action Block 305 (FIG. 3). The process then runs under the new release for the duration of the soak interval (Action Block 407). If at any time during this soak interval, trouble is discovered and it is felt expedient to return to the old release, then the flag is re-set, and the system/process runs under the old release and uses the old indirect data access table until the trouble has been corrected. If the trouble is in the new release, the new release may have to be updated, and this may involve also updating the data tables. If the system is operated successfully throughout the soak interval, then a permanent switch to the new release is made by updating the indirect data access table by copying the contents of the new data accessing table into the old data accessing table, and the flag is re-set (Action block 409). Subsequently, old memory space no longer needed, such as block 223 which contains the contents of the old ABC block can then be reclaimed.

Many other arrangements will be apparent to those of ordinary skill in the art without departing from the scope of applicant's invention. The invention, therefore, is limited only by the accompanying claims.

We claim:

1. A method of activating data for a new program release comprising the steps of:

accessing data via an active indirect data accessing table;

prior to activating data for a new program release, activating a first indirect data accessing table by using a starting address of said first indirect data accessing table as a starting address of an active indirect data accessing table;

initializing data tables required for a new program release;

in a second indirect data accessing table, initializing pointers to unchanged data tables to correspond to pointers of said first indirect accessing table; and initializing pointers to changed blocks of data to correspond to the addresses where the changed blocks of data have been stored; and responsive to a request to switch to a new program release, changing the starting address of an active indirect data accessing table to correspond to a starting address of said second indirect data accessing table.

2. The method of claim 1 wherein the step of changing the starting address of an active indirect data accessing table comprises the step of adding an offset to a starting address of said first indirect data accessing table.

3. The method of claim 2 wherein entries of said first and said second indirect accessing table are interleaved and said offset corresponds to a distance between corresponding interleaved addresses.

4. Apparatus for activating data for a new program release comprising:

memory for storing a program;

memory for storing data; and a central processing unit;

said memory for storing a first and a second indirect data accessing table;

said central processing unit, operative under the control of said program for:

accessing data via an active indirect data accessing table;

prior to activating data for a new program release, activating said first indirect data accessing by using a starting address of said first indirect data accessing table as a starting address of an active indirect data accessing table;

in said second indicate data accessing table, initializing pointers to unchanged data tables to correspond to pointers of said first indirect accessing table;

initializing pointers to changed blocks of data to correspond t the addresses where the changed blocks of data have been sorted; and responsive to a request to switch to a new program release, changing the starting address of an active indirect data accessing table to correspond to a starting address of said second indirect data accessing table.

5. The apparatus of claim 4 wherein changing the starting address of an active indirect data accessing table comprises adding an offset to a starting address of said first indirect data accessing table.

6. The apparatus of claim 5 wherein entries of said first and said second indirect accessing table are interleaved and said offset correspond to a distance between corresponding interleaved addresses.

* * * * *